United States Patent [19]

Robinson

[11] Patent Number: 5,190,070
[45] Date of Patent: Mar. 2, 1993

[54] LOCKABLE GAS VALVE

[76] Inventor: Larry Robinson, 605 E. Grove St., Pomona, Calif. 91767

[21] Appl. No.: 787,513

[22] Filed: Nov. 4, 1991

[51] Int. Cl.⁵ .............................................. F16K 35/00
[52] U.S. Cl. ...................................... 137/385; 137/613
[58] Field of Search ................................. 137/385, 613

[56] References Cited

U.S. PATENT DOCUMENTS

| 475,530 | 5/1892 | Zimmerman, Jr. | 137/385 |
| 746,500 | 12/1903 | Gummer | 137/613 |
| 993,372 | 5/1911 | Hipwell | 137/613 |
| 1,104,022 | 7/1914 | Tuttle | 137/385 |
| 1,315,054 | 9/1919 | Teisseire | 137/613 |
| 3,867,822 | 2/1975 | Morse et al. | 70/164 |
| 4,289,000 | 9/1981 | Nielsen, Jr. | 70/34 |

OTHER PUBLICATIONS

Inner-Tite Product Data Sheet No. 2M487, 1990.

Primary Examiner—A. Michael Chambers
Attorney, Agent, or Firm—Norton R. Townsley

[57] ABSTRACT

The present invention is a gas shut off valve (10) which can be locked without disassembly of the gas service. The preferred embodiment of this invention comprises a valve (10) having two chambers (26a, 26b). The first chamber (26b) is just like a standard gas valve, and has a handle (38) which can be turned with a standard tool, such as a commonly available wrench. This chamber (26b) is not lockable and is available for anyone to use for service modification or emergency shut off. The second chamber (26a) is identical in all respects to the first chamber with the exception of the shape of the handle (34). This second, "lockable" handle (34) is shaped like the plug (50) of plug lock assemblies manufactured by Inner-Tite Corporation. Because it has wrenching flats (45), the lockable handle (34) can also be turned with a wrench. In this way, the second chamber (26a) can be opened and closed. Furthermore, the outer body (12) of the plug lock assemblies manufactured by Inner-Tite Corporation can be locked in place over the handle (34) with the key (13) covered by U.S. Pat. Nos. 3,867,822 and 4,289,000. The key must be installed and removed using the special tools (68) covered by U.S. Pat. Nos. 3,867,822 and 4,289,000. Installation of the outer body (12) and key (13) will prevent unauthorized persons from tampering with the gas service. Using the improved shut off valve (10) of this invention, the gas utilities will be able accomplish positive, tamper proof locking of the gas shut off valve (10) without having to disassemble the service entrance.

4 Claims, 4 Drawing Sheets

LOCKABLE GAS VALVE

BACKGROUND OF THE INVENTION

The present invention relates to the field of plumbing and more particularly to gas shut off valves.

Natural gas, because it is a clean and inexpensive energy source, is used to power many domestic and industrial appliances, such as stoves, ovens, and water heaters. Natural gas is supplied to many residences and businesses in this country via networks of underground pipes. These networks are owned, operated and maintained by various gas utility companies. In the Los Angeles area, for example, the local gas utility is the Southern California Gas Company.

In order to monitor the use of natural gas by its customers, each gas utility typically installs a gas meter at the service entrance of each residence or business that it services. Additionally, in order to facilitate hook-up, provide for emergency shut off, and control access to only those customers who are authorized, the gas utility installs a gas shut off valve ahead of the gas meter. The shut off valve is generally connected to the meter by a short length of pipe known as a nipple.

Gas shut off valves have existed for many years. Some early designs were patented but these patents have now expired. A typical gas shut off valve used by the gas utilities at their service entrances is model 10685B, manufactured by A. Y. McDonald Manufacturing Company of Dubuque, Iowa. Because they must be fairly easy to operate in an emergency, gas shut off valves can generally be opened and closed with a commonly available wrench. A handle or tab, exterior to the valve body, is provided for this purpose. As part of their emergency preparations, many responsible home and business owners are aware of how to open and close the gas shut off valve. In fact, in the interests of safety, the gas utilities provide this knowledge to their customers.

Unfortunately, the gas utilities must use this same gas shut off valve to cut off service in case customers become delinquent in paying their bills. Using a wrench, many unscrupulous customers, simply turn the gas back on as soon as the gas company employee has turned it off.

Faced with this problem, the gas utilities have sought ways of locking standard gas shut off valves. Some involved use of boxes locked in place over the valve. However, these were easy to defeat or destroy. The most successful device to-date has been a special plug lock that installs in the female threads of the gas valve. This lock replaces the nipple between the valve and the gas meter.

This special lock is manufactured by Inner-Tite Corporation of Springfield, N.J. Their model numbers are G-1320 through G-1370, G-4320 through G-4370, G-1320A through G-1370A, G-4320A through G-4370A, G-1320C through G-1370C, and G-4320C through G-4370C. The lock consists of four components, a plug which threads into the female threads of the gas valve, has wrenching flats, and a special bore at its outer end; an outer body which slips over the plug; and a barrel lock, which secures the body to the bore in the plug. The barrel lock can only be inserted and removed from the plug with a special key. Once the outer body is installed, the wrenching flats cannot be reached and the entire assembly cannot be removed because the outer body turns freely on the plug. The barrel lock and the key are covered under U.S. Pat. Nos. 3,867,822 and 4,289,000.

Availability of the key is limited. Furthermore, customers are reluctant to tamper with the collar because of the fear of damaging the gas supply line. The main disadvantage of using the collar is that to use it the gas service must be disassembled. This is an expensive, time consuming and sometimes dangerous operation.

Use of the Inner-Tite plug locks listed above has been very effective in solving the gas companies' problems. However, installation of the lock necessitates disassembly of the service entrance. Development of a gas valve which had all the positive features of the Inner-Tite lock yet would be lockable without disassembly of the gas service would represent a great improvement in the field of gas shut off valves and satisfy a long felt need of the gas utilities and their employees.

SUMMARY OF THE INVENTION

The present invention is a gas shut off valve which incorporates all the positive features of Inner-Tite locks yet is lockable without disassembly of the gas service. The preferred embodiment of this invention comprises a valve having two chambers. The first chamber is just like a standard gas valve, and has a handle which can be turned with a standard tool, such as a commonly available wrench. This chamber is not lockable and is available for anyone to use for service modification or emergency shut off.

The second chamber is identical in all respects to the first chamber with the exception of the shape of the handle. This second, "lockable" handle is shaped like the plug of the Inner-Tite lock. Because it has wrenching flats, the lockable handle can also be turned with a wrench. In this way, the second chamber can be opened and closed. However, because it is also shaped like the Inner-Tite plug, the outer body and barrel lock of the Inner-Tite lock can be installed in place over the lockable handle.

Thus, when it is desired to prevent unauthorized persons from turning the lockable handle, the outer body and the barrel lock can be installed over it using the special key. While the outer body and barrel lock could be used to lock the lockable handle in either the open or closed position, the gas utilities will generally use the locking collar to lock the lockable handle after it has been turned to its closed position. By using the improved shut off valve of this invention, the gas utilities will be able accomplish positive, tamper proof locking of the gas shut off valve without disassembling the service entrance.

An appreciation of the other aims and objectives of the present invention and a more complete and comprehensive understanding of it may be achieved by referring to the accompanying drawings and studying the following description of a preferred embodiment.

BRIEF DESCRIPTION OF THE DRAWINGS

FIG. 1 shows the preferred embodiment of the lockable gas valve, without the locking collar in place.

FIG. 4 shows the preferred embodiment of the lockable gas valve, with the outer body and barrel lock in place.

DETAILED DESCRIPTION OF THE PREFERRED EMBODIMENT

Figure 1A:
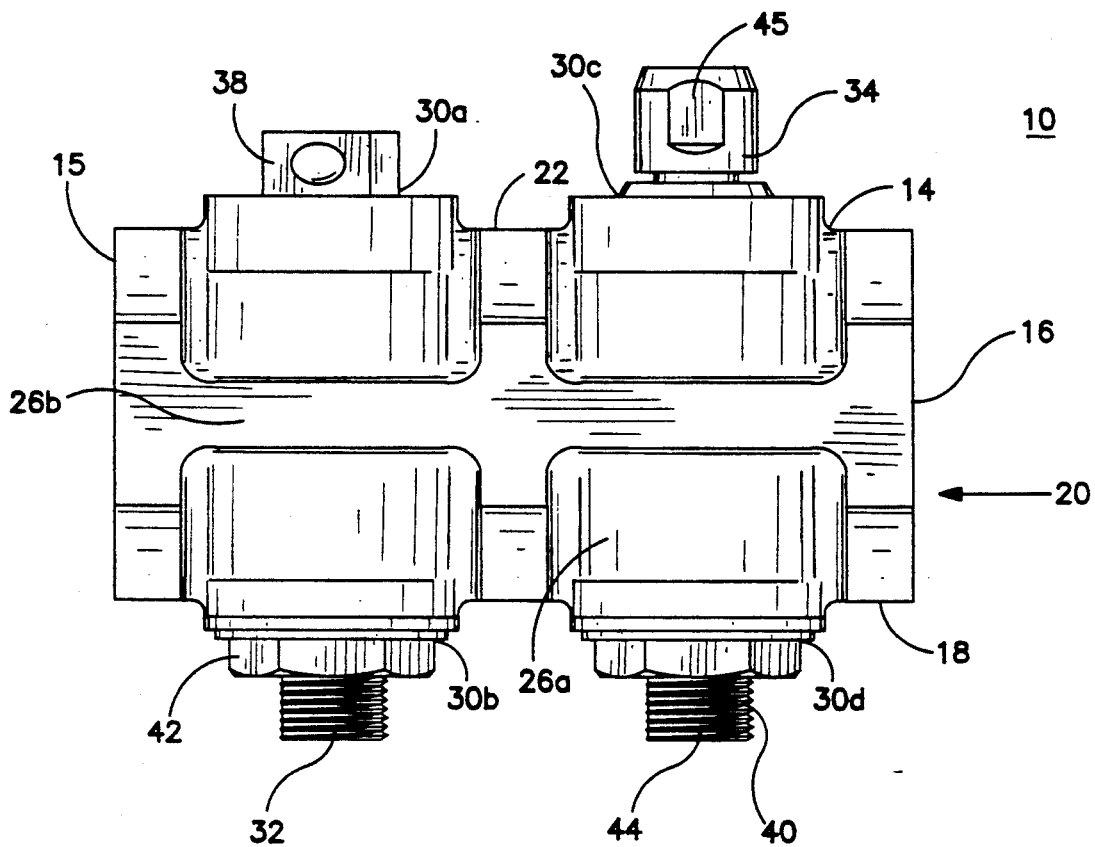
FIG. 1A is a side view and FIG. 1B is a top view.
Figure 1B:
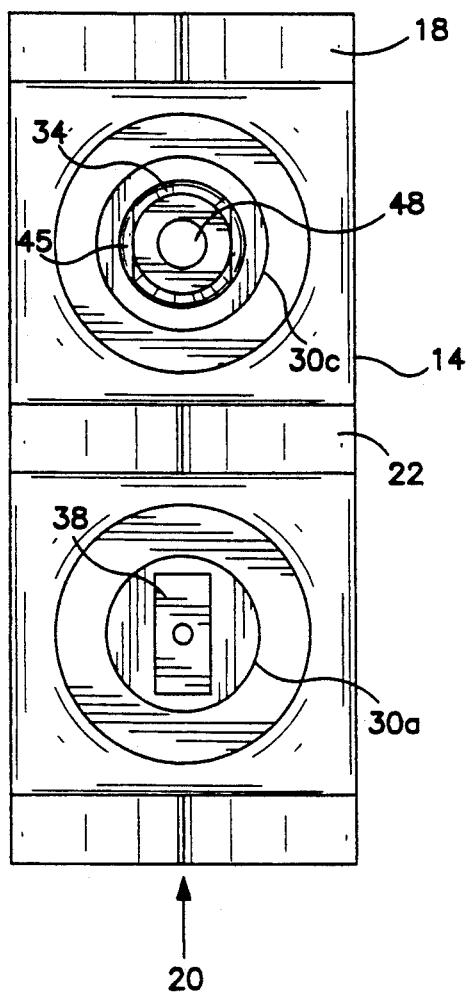

FIG. 1 shows the preferred embodiment of the lockable gas valve 10, without the outer body 12 and barrel lock 13 and in place. The valve 10 comprises an essentially cylindrical, hollow, symmetrical body or housing 14. Consequently, the housing 14 has an interior 14a and an exterior 14b (not illustrated on FIG. 1). Each end 15 of the housing 14 is provided with female threads 16 for attachment to pipes and nipples and wrenching flats 18 for installation. A center wrenching flat 22 may also be provided.

The valve 10 has two sides or chambers 26: a lockable side or chamber 26a and a non-lockable side or chamber 26b. Each chamber 26 has two diametrically opposed, transverse openings 30. Through the openings 30a, 30b in the non-locking chamber 26b is a standard valve stem 32, which has threads 40 on one end and a tab or handle 38 at the other. In conventional manner, the stem 32 is retained in place by a nut 42. This chamber 26b, with its stem 32, is entirely similar in construction to a standard gas valve. As with standard gas valves, the handle 38 is shaped like a tab so it can turned with a commonly available tool, such as a wrench: it cannot be turned with finger pressure alone.

Through the openings 30c, 30d in the lockable chamber 26a is a lockable valve stem 44. It also has threads 40 and is retained in place by a nut 42. However, the handle 34 of the lockable stem 44 is shaped like a the Inner-Tite plug, with side wrenching flats 45 and a internal bore 48 which is shaped to retain the barrel lock 13. This chamber 26a is entirely similar in construction to a standard gas valve except for the design of the handle 34. Again, the handle 34 must be turned with a commonly available tool, such as a wrench engaging the wrenching flats 45, and cannot be turned with finger pressure alone.

Figure 2:
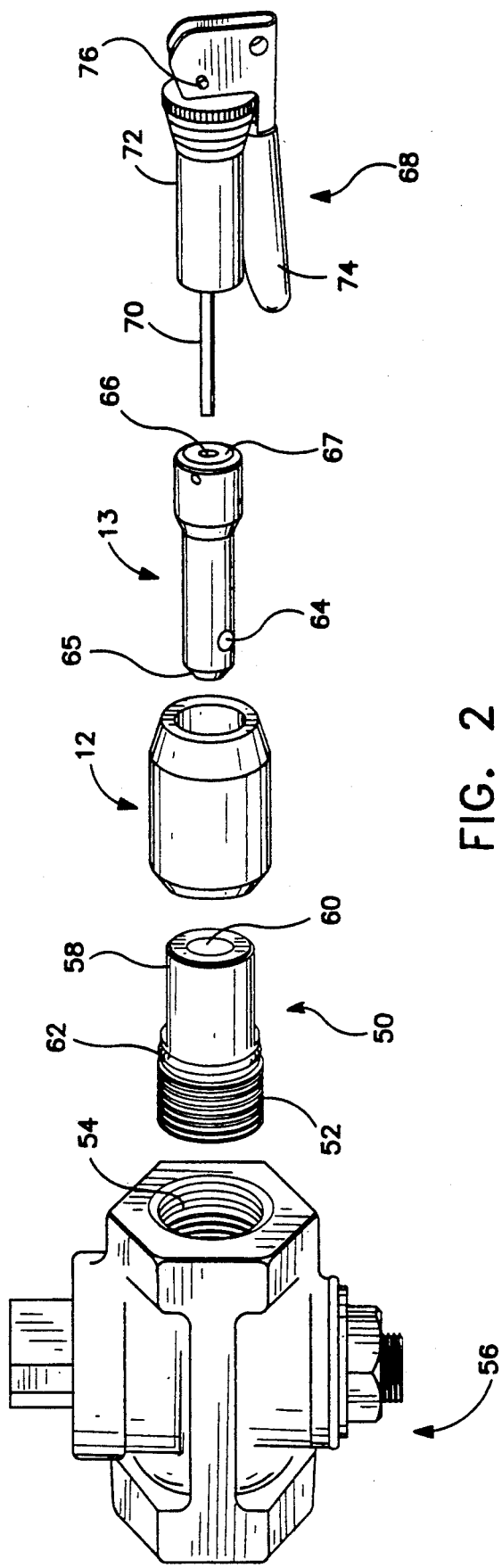
FIG. 2 is an exploded view of a typical Inner-Tite lock assembly.

FIG. 2 shows an exploded view of the Inner-Tite plug lock assembly. It comprises a special plug 50, an outer body 12, and a lock 13 in accordance with U.S. Pat. Nos. 3,867,822 and 4,289,000. The plug 50 has male threads 52 at one end which will mate with the female threads 54 of a typical gas valve 56. Wrenching flats 58 allow the plug 50 to be installed in the valve 56 with a wrench. There is an internal bore 60 at the end opposite the threads 52. This bore 60 extends part way through the plug 50 and is shaped to receive the patented lock 13. In addition, an O-ring 62, to facilitate sealing, is located approximately midway along the plug 50.

The outer body 12 is essentially a hollow cylinder made of hardened steel. This fits snugly over the plug 50. The outer body 12 is retained by inserting the lock 13 into the bore 60 of the plug 50. Complete details of construction and operation of the lock 13 are shown in U.S. Pat. Nos. 3,867,822 and 4,289,000. For the purposes of the current invention it is important to note that the lock 13 has spring operated retention balls 64 near the end 65 which is inserted into the bore 60 of the plug 50, and a key hole 66 in its outer end 67. It is the retention balls 64 which retain the lock 13 in the plug 50.

The key 13 can only be installed on and removed from the plug 50 by use of a special tool 68. The tool 68 has a stem 70, and a main body 72 and handle 74 which are joined at a pivot point 76. In order to accomplish key 13 installation and removal, the stem 70 is inserted into the key hole 66 and the handle 74 is pivoted in line with the body 72. More complete details of construction and operation of the tool 68 are given in U.S. Pat. Nos. 3,867,822 and 4,289,000. After installation, the outer body 12 can freely rotate about the plug 50. Thus no amount of twisting and turning will remove the outer body 12. Furthermore, being made of hardened steel, cutting for removal is impossible without highly specialized cutting tools.

Figure 3:
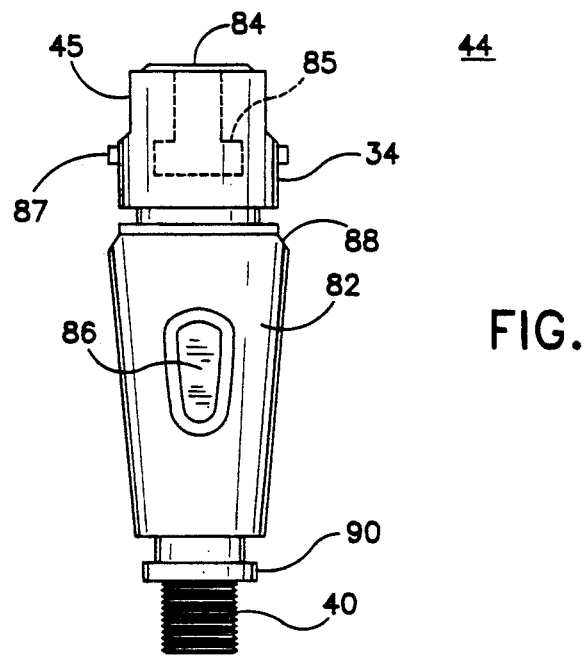
FIG. 3 is a side view of the lockable valve stem used in this invention.

FIG. 3 shows a side view of the lockable stem 44. It has a handle 34 at one end, a main body 82, which is not visible in FIG. 1, and retention threads 40 at the other end. The handle 34 has wrenching flats 45 and in internal, blind bore 84. The handle, 34 also has an O-ring 87 (not illustrated on FIG. 3), located adjacent to the flats 45. The bore 84, has an annular groove 85 at its internal end. The retention balls, 64 will seat against this groove 85 when the lock 13 is inserted in the bore 84. In this way the key 13 will be locked in place. The main body 82 is pierced by a passageway 86. Gas flows through this passageway 86 when the flats 45 are turned parallel to the valve body 14. Gas flow is blocked when the flats 45 are turned at right angles to the valve body 14. The stem 44 can be turned by engaging a wrench on the wrenching flats 45. A bevel 88 and shoulder 90 aid in retention of the stem 44 in the holes 30c, 30d. The non-lockable stem 32 is identical to the lockable stem 44 except that the handle 38 of the non-lockable stem 32 is shaped like a simple tab that can be turned with a wrench.

Figure 4B:
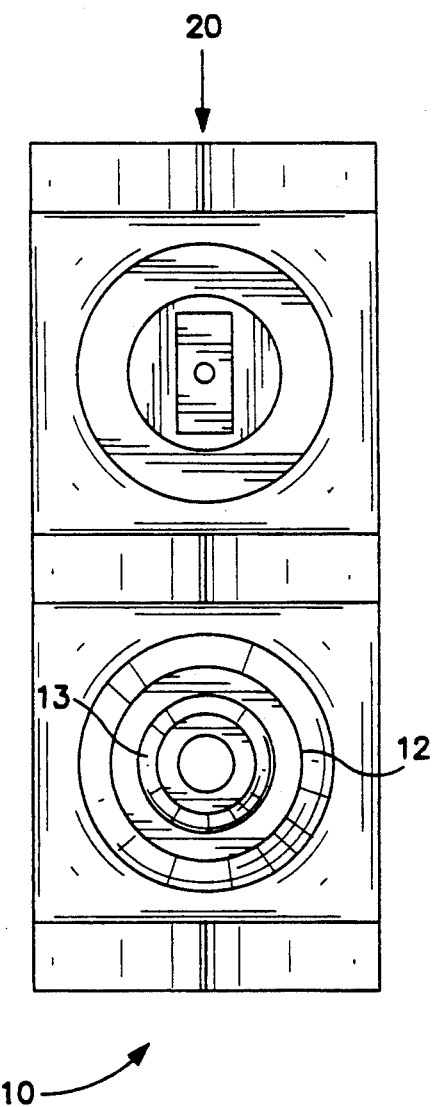
FIG. 4A is a side view and FIG. 4B is a top view.
Figure 4A:
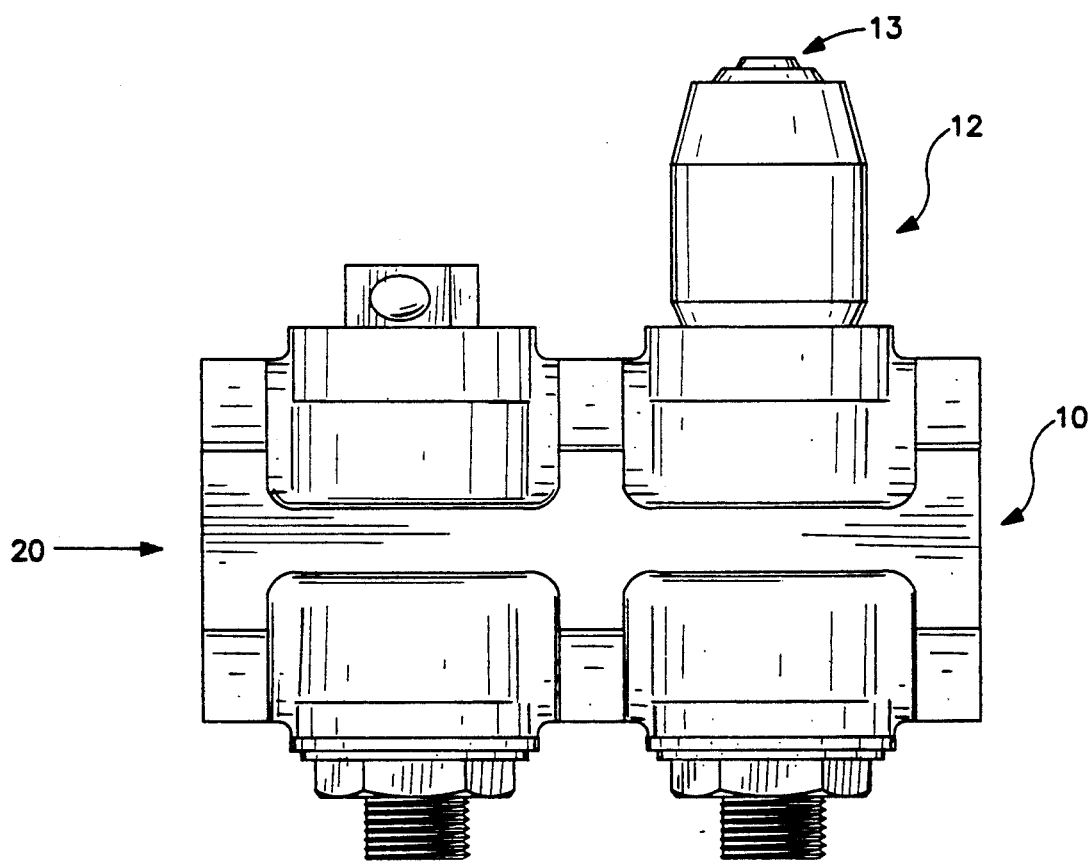

FIG. 4 shows the lockable valve 10 with the outer body 12 and key 13 in place on the lockable handle 34, which cannot be seen on this Figure. The outer body 12 cannot be removed by turning or cutting. When the outer body 12 is in place on the valve 10, the lockable 34 handle cannot be turned. However, the non-lockable handle 38 is still accessible for use in turning off the gas in case of emergency or alteration to the gas system inside the customer's premises. It is apparent from the above description of this invention, that use of the improved gas shut off valve 10 in conjunction with the patented locking collar 12 will enable the gas utility to effectively prevent unauthorized persons from opening a closed service entrance. If desired, the gas company could also use this valve 10 in conjunction with the collar 12 to lock the service entrance in an open position.

The improved gas shut off valve 10 has been described with reference to a particular embodiment. It is obvious that only the lockable chamber 26a of the valve 10 is essential to provide locking features and lockable gas valves 10 having only this lockable chamber 26a could be built. To ensure adequate safety in installations using them, such lockable valves 10 would have to be connected to standard gas valves. If standard valves were not used, the ability to turn off the gas in case of emergency could conceivably be compromised. The preferred embodiment 10, incorporating lockable 26a and non-lockable 26a chambers ensures that all pertinent safety precautions are automatically taken. It should be obvious to those skilled in the art to which this invention pertains that other modifications and enhancements can be made without departing from the spirit and scope of the claims that follow.

What is claimed is:

1. A gas shut off valve comprising:
   a housing, of essentially cylindrical shape, having a central, longitudinal bore and an outside;
   a valve stem having an essentially solid cylindrical shape and a medial opening; said valve stem being pivotally mounted perpendicularly within said central, longitudinal bore so that said medial opening can be rotated from a position parallel to said central, longitudinal bore to a position transverse to said central, longitudinal bore and so that when said medial opening is parallel to said central longitudinal bore, gas flow is permitted and when said medial opening is transverse to said central, longitudinal bore gas flow is prevented;

a handle, coaxial and integral with said valve stem and projecting to said outside of said housing; said handle having an essentially cylindrical shape and wrenching flats; said handle being adapted to receive a locking collar and a key-actuated, removable lock; said locking collar having a hollow cylindrical shape; said handle being designed so that said locking collar can be slipped over said handle and so that said key-actuated, removable lock can retain said locking collar in place on said handle; said handle being designed so that, when said locking collar is locked in place over said handle by said key-actuated, removable lock, said wrenching flats are inaccessible; and means for attachment to gas pipes.

2. A gas shut off valve as claimed in claim 1 further comprising:

a second valve stem having an essentially solid cylindrical shape and a medial opening; said second valve stem being pivotally mounted perpendicularly within said central, longitudinal bore so that said medial opening can be rotated from a position parallel to said central, longitudinal bore to a position transverse to said central, longitudinal bore and so that when said medial opening is parallel to said central longitudinal bore, gas flow is permitted and when said medial opening is transverse to said central, longitudinal bore gas flow is prevented; said second valve stem being in close proximity to said valve stem; and a non-lockable handle, coaxial and integral with said second valve stem and projecting to said outside of said housing; said non-lockable handle having wrenching flats.

3. A gas shut off valve comprising:

a housing of an essentially cylindrical shape having a first end, a second end, a first transverse opening, a second transverse opening, a central longitudinal bore, and an exterior; said first transverse opening and said second transverse opening being located between said first end and said second end and diametrically opposite to each other;

a valve stem of an essentially solid cylindrical shape having a medial, transverse opening and a handle; said valve stem being rotatably secured, diametrically, between said first transverse opening and said second transverse opening so that said medial opening is located within said central, longitudinal bore of said housing and said handle is located to said exterior of said housing; said valve stem being capable of being rotated so that said medial opening can move from a position parallel to said central, longitudinal bore to a position transverse to said central, longitudinal bore so that when said medial opening is parallel to said central longitudinal bore, gas flow is permitted and when said medial opening is transverse to said central, longitudinal bore gas flow is prevented;

said handle having an essentially cylindrical exterior, a central blind bore open to the outside, and wrenching flats; said handle being adapted to receive a locking collar on said essentially cylindrical exterior; said locking collar having a hollow cylindrical shape; said central blind bore being adapted to receive a key-actuated, removable lock; said handle being designed so that said locking collar can be slipped over said handle and so that when said locking collar is in place over said handle, said wrenching flats are inaccessible; said central blind bore being designed so that said key-actuated, removable lock can retain said locking collar in place on said handle;

means for rotatably sealing said locking collar to said handle so that atmospheric contamination is precluded;

means for connecting said housing to a pipe; and means for allowing said housing to be grasped by a wrench.

4. A gas shut off valve as claimed in claim 3 further comprising:

a second valve stem having an essentially solid cylindrical shape and a medial opening; said second valve stem being pivotally mounted perpendicularly within said central, longitudinal bore so that said medial opening can be rotated from a position parallel to said central, longitudinal bore to a position transverse to said central, longitudinal bore and so that when said medial opening is parallel to said central longitudinal bore, gas flow is permitted and when said medial opening is transverse to said central, longitudinal bore gas flow is prevented; said second valve stem being in close proximity to said valve stem; and a non-lockable handle, coaxial and integral with said second valve stem and projecting to said outside of said housing; said non-lockable handle having wrenching flats.

* * * * *